United States Patent Office 3,689,473
Patented Sept. 5, 1972

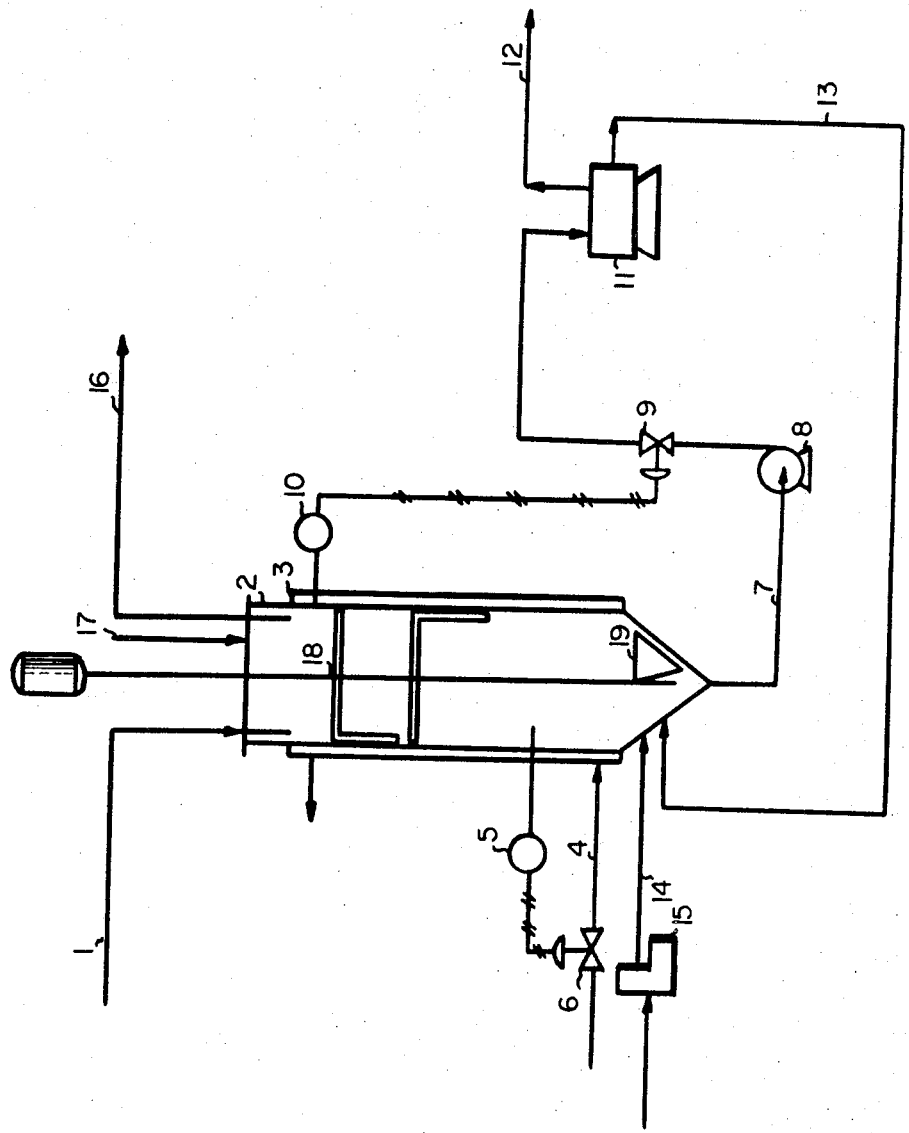

3,689,473
PROCESS FOR REMOVING CATALYST METAL RESIDUES FROM HIGH DENSITY POLYETHYLENES
Agostino Balducci, San Donato Milanese, and Agostino Bardel, and Marena Massino, Milan, Italy, assignors to Snam Progetti S.p.A., Milan, Italy
Filed Nov. 6, 1970, Ser. No. 87,496
Claims priority, application Italy, Nov. 7, 1969, 24,108/69
Int. Cl. C08f 1/38, 1/88, 3/06
U.S. Cl. 260—94.9 F    12 Claims

ABSTRACT OF THE DISCLOSURE

High density polyethylene is freed of catalyst metal residues by contacting with a mixture of an anhydrous alcohol and a hydrocarbon, which is the same as that used as the suspension medium in the formation of the polyethylene. It is preferred to carry out the contacting in a countercurrent apparatus in which the polyethylene flows downwardly against an upwardly moving stream formed from the anhydrous alcohol and the hydrocarbon.

---

Figure 1A:
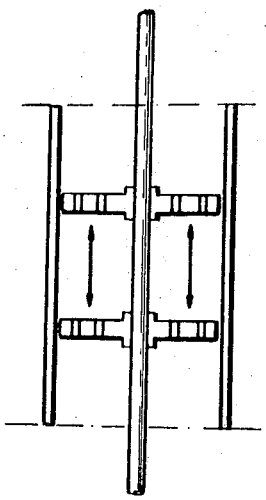

Object of the present invention is a process for removing catalyst metal residues from high density polyethylene, which high density polyethylene comprises both ethylene homopolymers and copolymers with an amount of alpha-olefins not higher than 5% by weight and having a density not lower than 0.945, and the apparatus suitable to realize said process.

In the prior art many processes are known suitable to remove catalyst metal residues from polymers.

Said processes, owing to the increasing use of Ziegler polymerizations, aim to eliminate the metal residues, which substantially are:

(1) aluminum present in organometallic compounds representable with the general formula AlR₁R₂X, where, as known, R₁ and R₂ are hydrocarbon radicals, one of which may be a halogen atom, and X a halogen atom;

(2) titanium deriving from originally introduced compounds having the general formula TiX₄ or TiX₃ where X is generally a halogen atom.

Said washing processes which are known in the prior art as organic washings generally consist in treating, in suitable contact apparatus, the polymer-hydrocarbon mixture with a water-alcohol-hydrocarbon mixture, e.g. by countercurrent contact, in a column, of the solvent-hydrocarbon liquid stream and of the polymer suspension, said column being provided with suitable stirring means so as to improve the contact between the different phases which are created inside the apparatus.

In the washing processes till now known in the art the polymer is introduced in the washing apparatus after being dispersed in the hydrocarbon medium so as to increase the contact surface between polymer and washing means. The ratio by weight between hydrocarbon suspension medium and polymer is kept in this type of operations in the range between 5/1 and 20/1 so as to prevent the polymeric phase in suspension from being too viscous.

The solvent utilized for removing Ziegler catalyst residues contained in the polymer has to be only partially soluble in the suspension agent and to be a good solvent for Ziegler type catalysts. Usually it is preferred to make use of a solvent having a density higher than the polymeric suspension so as the polymer may be introduced near the bottom of the cited extraction column and drawn from the top, while the extraction solvent is introduced into the column top.

Both the extraction solvents and the polymer suspension agents used in the various steps are already known in the prior art.

In conclusion for removing the catalyst residues according to the process known in the art, said residues are contacted with a suitable alcohol mixed to the polymer suspension liquid under stirring so as to improve the contact between polymer and solvent, which is generally present, compared to the polymer in a ratio of 10/1 or lower.

The cited methods, already known in the art, with reference to the above-mentioned solvent cannot be utilized in the case of the ethylene polymerization catalyst which are different from the ones of Ziegler type, since the polymer would not reach the desired purity.

It is known from B.P. 1,131,258 a process which makes use of particular ethylene polymerization catalysts wherein a titanium compound is present, and an aluminum compound being of inorganic nature and a polymeric type presenting units repeated from 4 to 50 times having the general formula

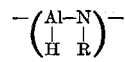

wherein R is an aryl, alkyl or cycloalkyl group.

The present invention relates to the removal of catalytic residues derived just from the polymerization process last described, said removal being strictly connected to the presence in the final polymer of aluminum, the aluminum itself being in the form of polymeric compound, which does not allow in said case the use of known processes.

Further the present invention is more generally directed also to the removal of catalytic residues from polymers obtained according to processes which use, as catalyst system components, at least a component preferably not the transition metal, in the form of a polymer.

Moreover the present invention surprisingly makes it possible to reach a completely satisfactory industrial result in an extremely simple and economical way.

In the process according to the present invention the polymer in hydrocarbon suspension, consisting of high density polyethylene, obtained according to the process described in B.P. 1,131,258, suspended in the hydrocarbon used as polymerization medium, is introduced into a contact apparatus whereto a mixture is continuously and contemporaneously fed, said mixture comprising the same hydrocarbon utilized as polymerization medium and thoroughly dehydrated alcohol and containing water in an amount not higher than 10 p.p.m.

The aforesaid water amount is a critical factor; in fact the polymerization process according to B.P. 1,131,258 foresees, as aforesaid, the use of a catalytic system comprising a polymeric aluminum compound (polyimminoalane) together with a titanium compound (e.g. TiCl₃); when the polymerization has been completed a polyethylene which includes the catalyst residues of the titanium compound and of polymeric aluminum compounds formed by polymer chains consisting of from 4 to 50 repeated units of the type

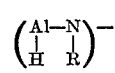

is obtained. The polyimminoalane is easily made insoluble by introducing some oxydrilic group in the chain transforming it e.g. into

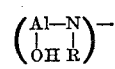

According to the present invention the overall present water amount has to be reduced to a few p.p.m. taking into account that any water molecule present in the alcohol can block two active hydrogen atoms of polyimminoalane having the tendency to make insoluble two complete molecules having from 4 to 50 aluminum atoms.

In fact between a normal molecule and a molecule containing an oxydrilic group an Al—O—Al bridge is formed, a hydrogen molecule being freed. In said conditions, i.e. when according to the present invention the water amount is accurately verified and limited to the before defined amounts, because of the presence of alcohol, soluble alcoholates of the catalyst metal residues are formed, said residues being removed in said form.

The hydrocarbon polymer suspension is fed through one or more points or through a distributor to the top of a column wherein the polymer is packed from the bottom up to a certain height of the column in order to achieve the conditions necessary to the process according to the present invention. To the bottom, near the column end, a stream formed by a mixture of alcohol and hydrocarbon is fed through one or more points or through a distributor, said hydrocarbon being the same used in the polymerization step; said stream slowly flows upwards through the polymer packed bed, removing the metals contained in the catalyst.

The ascending liquid advances with a plug flow, i.e. the front of the lean solvent advances uniformly along the column filtering through the polymer packed bed.

The column is provided with suitable stirring means so as to avoid preferential paths along the same, said devices serving to only to stir the polymer and therefore the motion of said stirring means has to be very slow.

Above the packed bed there is the liquid phase containing the dissolved catalyst metal residues, said phase being formed of the hydrocarbon introduced with the polymer and the alcohol and of the alcohol itself.

The space inside the column is prevailingly occupied by the packed bed. In the washings according to the present invention the ratio by weight between the alcohol utilized in the solvent mixture and the polymer ranges from 1/10 to 1/2.5; it is easily noted that the method herein described allows, owing to the particular operation conditions, a great saving in the amount of used solvent and this causes also a great reduction of the dimensions of the used contact apparatus: the whole is coupled to a very high polymer purification as it is possible to remark also from the successively reported examples.

From the column bottom a stream is discharged containing polymer free or substantially free of catalyst metal residues, said polymer being in suspension in the mixture of the hydrocarbon and alcohol; said stream is sent to a centrifuge, so as to recover the mixture which is recycled to the column bottom. The polymer is at last dried by conventional means.

From the column top a liquid stream is discharged which stream consists of the hydrocarbon suspension agent and the alcohol containing the dissolved catalyst metal residues.

The alcohol used in the process according to the present invention is any aliphatic alcohol having from 2 to 8 carbon atoms; the alcohol concentration in the washing alcohol-hydrocarbon mixture fed to the column bottom is in the range of 1 to 50% by weight.

Preferably ethanol, n-butanol, i-propanol and i-butanol are used; the hydrocarbon, which is like the one used as polymer suspending agent, is one of those known in the art for the polymerization.

The operation in the washing column is carried out at a temperature between room temperature and 110° C. and at pressures which insure no one of the liquids present in the column boils at the working temperature.

The operative conditions as temperatures, pressures, contact times a.s.o., may be varied in large ranges in accordance with the desired purification. In conclusion the main characteristic of the process according to the present invention consists in: forming inside the washing column a packed polymer bed which moves with a plug flow; through said bed in direction opposite to the polymer motion a mixture of hydrocarbon and alcohol is made to flow, said mixture advancing with plug flow so as to avoid the formation of preferential paths through the polymer, the polymer mass being slowly stirred.

Another fundamental characteristic consists in the fact that the used alcohol must be practically anhydrous, must not contain more than 10 p.p.m. water. The advantages offered by the process according to the present invention compared to the methods already known in the art are the following:

(1) high extraction efficiency which permits operation wtih low hydrocarbon-alcohol solution: polymer ratio (as e.g. 1/2) with evident operative savings, because of the smaller flows involved, being the other factors the same;

(2) high extraction velocities with reduction of installation costs, because of the smaller dimensions required by the apparatus (this fact is also due to the reasons explained in point (1).

The process according to the present invention is carried out in an apparatus wherein it is possible to realize the aforementioned operatiev conditions.

A particularly suitable apparatus is the one afterwards described which constitutes a further object of the present invention.

The apparatus according to the present invention consists of a column working, as said, with a polymer packed zone and an upper zone of clarification between liquids and light solids; said column is provided with devices suitable to avoid the formation of fluid threads as for instance:

(a) longitudinally vibrating device composed of a shaft which supports some bored disks;

(b) slowly rotating device constituted by a shaft having blades opportunely shaped so that a radial motion from the outside to the inside of the bed mass and contemporaneously a longitudinally motion of the solid bed are generated.

Figure 1B:
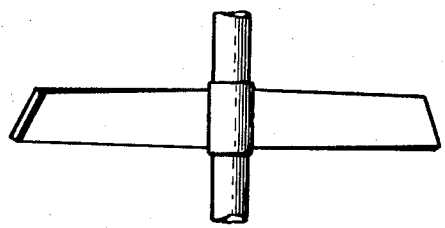
Figure 1C:
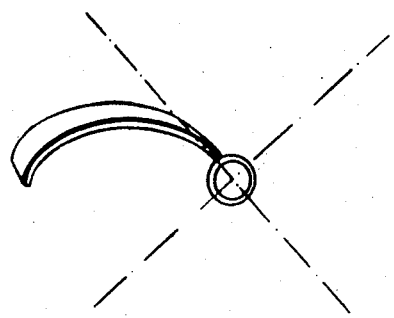

Said devices are summarily shown in FIG. 1.

At the column bottom either a continuous discharging system is provided which may be either an open impeller pump or a screw pump continuously discharging the polymer or a discontinuous discharging system which may be formed of a sphere having a cavity in the form of a sector, rotating by means of an electric motor at variable speed so as to make it possible a greater or smaller polymer drawing, the sphere cavity containing the polymer being continuously washed by a stream of recycle solvent or of not recycle solvent.

The invention will be illustrated with reference to the drawing wherein an embodiment of the invention is shown, said embodiment being to be considered as not limitative of the same.

With reference to FIG. 2 the polymeric solution to be treated is fed into column 2 through duct 1.

To the bottom through 14 the alcohol and hydrocarbon mixture is introduced, said mixture passing through the metering pump 15.

The column is provided with a heating jacket 3 whereto a hot fluid is introduced through 4.

The temperature inside the column is regulated by the sensitive instrument 5 acting on the valve 6 which regulates hot fluid flow rate.

Further the column is provided with a system for stirring the mass formed (in the case shown in the figure), by slowly rotating blades 18; said stirring aims to avoid preferential paths for the solvent which rises through the polymer mass.

The element 19 is used to convey and to press toward the column bottom the polymer mass and it is in the form suitable to perform this operation. In the particular embodiment shown in FIG. 2, also vertical blades are provided for avoiding the polymer deposit on the column walls.

From the column top through 16 the alcohol-hydrocarbon mixture is discharged, said mixture containing the catalyst dissolved salts, while from the column bottom through 7 the substantially catalyst-free polymer together with an alcohol-hydrocarbon mixture is drawn. The whole is fed by means of pump 8 to the centrifuge 11, wherein the alcohol-hydrocarbon mixture which is recycled through duct 13 to the column bottom, is separated; the polymer is discharged through 12 and is forwarded to successive treatments.

Valve 9 is regulated by sensitive element 10 which controls the level of the interfaces between the polymeric phase and the upper liquid and intervenes when the interfaces level changes.

Through 17 nitrogen or another inert gas is fed so as to create such an overpressure that the liquids which are in the column at the operation temperature do not boil; further the inert gas feeding serves the purpose of avoiding an air inlet into the column; said air by oxidizing the catalytic system components makes difficult their removal.

The following examples serve the purpose of illustrating the invention without considering them as limitative of the same.

EXAMPLE 1

To the top of a column provided with a device for stirring the polymer mass, 60 cm. high, having a working volume of 1500 cm.³, kept at 90° C. by means of a jacket whereto hot oil is fed, a suspension in n-heptane of polyethylene, obtained utilizing a polyimminoalane and TiCl₃ as catalyst, has been introduced. Said column was filled with haid suspension and then the pump for introducing the alcohol-hydrocarbon mixture was started, said mixture being in that case n-heptane having 17% by weight of ethyl alcohol.

Said mixture was fed until the samples drawn from the outlet at the column top showed titanium was absent.

At this time the continuous operation started, by drawing out the polymer from the column bottom, by feeding to the column top the hydrocarbon suspension of polyethylene at a rate of 500 g./h. of polymer and from the bottom by continuously pumping alcohol-hydrocarbon mixture at a rate of 1500 cc./h. of mixture.

In said conditions from the column a suspension of polymer, alcohol and hydrocarbon was discharged wherefrom the polymer and the alcohol-hydrocarbon mixture were recovered; said last mixture was recycled to the column bottom. Two tests were effected, the conditions being the same, utilizing in both of them a polymer which initially presented a metal amount of 680 p.p.m. of Ti and of 1060 p.p.m. of Al. The following results were obtained:

|          | Ti, p.p.m. | Al, p.p.m. |
|----------|------------|------------|
| 1st test | 2.4        | 80         |
| 2nd test | 4.2        | 60         |

EXAMPLE 2

Other tests were carried out for better illustrating the possibility of complete removal of titanium from the polymer, by utilizing a column filled with polymer, the alcohol-hydrocarbon mixture being fed to the bottom of said column.

In this case a column 100 cm. high and having a capacity of 600 cm.³ and containing the polymer at a concentration of 450 g./l. was used.

The alcohol-hydrocarbon mixture consisted of n-butyl alcohol and n-heptane.

The results were reported in the following table:

|     | Ti (p.p.m.) | Al (p.p.m.) | Duration time, hr. | Pump capacity, cc./hr. | Alcohol in mixture, percent by wt. | Metals, amount at end of test Ti (p.p.m.) | Al (p.p.p.) |
|-----|-------------|-------------|--------------------|------------------------|------------------------------------|-------------------------------------------|-------------|
| (1) | 440         | 630         | 16                 | 120                    | 5.5                                | 0                                         | 32          |
| (2) | 360         | 500         | 3                  | 600                    | 5.5                                | 0                                         | 34          |
| (3) | 360         | 400         | 3                  | 600                    | 11                                 | 0                                         | 21          |

The following example relates to the more general case of polymerization and washing of high density polyethylene (both ethylene homopolymers and copolymers of the same with an α-olefin amount not higher than 5% by weight and having a density not less than .945 can undergo the same treatment.

Said polymerization is normally carried out under a pressure between 1 and 100 atmospheres and at a temperature between 0° and 120° C. in presence of a catalyst system comprising a compound of a transition metal and a polyimminoalane having the general formula

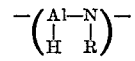

EXAMPLE 3

Into a stainless steel vessel, provided with a stirring device, having a volume of 4 liters, kept at a constant temperature of 95° C. by means of a thermostat, 2 liters of high purity heptane containing 4 mmoles/liter of TiCl₃ and 4 mmoles/liter of polyimminoalane having in its molecule 6 repeated units of the type

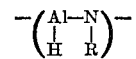

were fed, there being in said autoclave ethylene at a partial pressure of 2.15 kg./cm.² and hydrogen at a partial pressure of 2.3 kg./cm.².

The polymerization was carried out for 4 hours, always maintaining constant the ethylene partial pressure.

365 g. of raw polyethylene per liter of solvent were obtained, i.e. 730 g. as total, being a yield of 320 g. polymer per gram of total catalyst. The polymer practically containing all the catalytic residue was purified as described in the preceding example with the difference that the used alcohol was isobutyl alcohol.

At the end of the purification operation polyethylene had the following catalyst residue amount:

Ti=3 p.p.m.: Al=70 p.p.m.

The characteristics of the obtained polyethylene were the following:

| Specific gravity | 0.957 |
|---|---|
| MFI (melt flow index) | 0.4 |
| Tensile stress | 300 |
| Yield point | 290 |
| Ultimate elongation percent | 900 |
| Softening point (Vicat), °C. | 130 |
| Final melting point, °C. | 135.5 |
| Methyl per thousand | 3 |
| Percent crystallinity RX | 88 |

What we claim is:

1. A process for removing catalyst metal residues from high density polyethylene by treating polyethylene with a solvent consisting of a mixture of an aliphatic alcohol, which must be anhydrous, i.e. containing less than 10 p.p.m. H₂O, and a hydrocarbon comprising the following steps:
(a) introducing polyethylene, obtained by polymerizing ethylene in presence of a catalyst comprising a compound of a transition metal and an aluminum compound presenting units repeating from 4 to 50 times of type

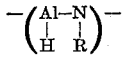

where R represents an aryl, alkyl or cycloalkyl group in a hydrocarbon suspension to the top of a suitable washing column and introducing at the bottom of said column a stream formed of the hydrocarbon utilized as polymer suspension medium and of an anhydrous alcohol;
(b) making the solvent stream flow very slowly upwards and with a plug flow through the packed bed of the polymer contained in the column, said packed bed going down with a plug flow too;
(c) discharging from the bottom of said column the polymer free or substantially free of the catalyst metal components together with a hydrocarbon-alcohol mixture which, after the polymer has been separated by known methods, is recycled to the column bottom;
(d) drawing from the column top a mixture composed of the hydrocarbon and of the alcohol containing the dissolved catalyst metal residues.

2. Process according to claim 1 characterized in that the alcohol is any aliphatic alcohol containing from 2 to 8 carbon atoms.

3. Process as claimed in claim 2 characterized in that the alcohol is ethanol.

4. Process as claimed in claim 2 characterized in that the alcohol is n-butanol.

5. Process as claimed in claim 2 characterized in that the alcohol is i-propanol.

6. Process as claimed in claim 2 characterized in that the alcohol is i-butanol.

7. Process according to claim 1 characterized in that the alcohol concentration in the hydrocarbon is in the range between 1% and 50% by weight.

8. Process as claimed in claim 1 characterized in that the ratio by weight between the alcohol present in the washing mixture and the polymer ranges from 1/10 to 1/2.5.

9. Process as claimed in claim 1 characterized in that the operative temperature is in the range between room temperature and 110° C.

10. Process as claimed in claim 1 characterized in that inside the apparatus, by feeding an inert gas, the pressure is kept at such a level that the liquids present at the operative temperatures do not boil.

11. Process for the production of ethylene polymers having high density and purity, comprising the following steps:
polymerizing ethylene under a pressure in the range from 1 to 100 atmospheres and at a temperature from 0° C. to 120° C. in presence of a catalytic system including a compound of a transition metal and of a polyimminoalane having the general formula

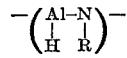

recovering a raw polymer containing catalyst impurities;
subjecting the obtained raw polymer to a purification treatment according to claim 1;
recovering polyethylene containing no more than 100 p.p.m. of catalytic residues.

12. Process as claimed in claim 1 characterized in that the compound of a transition metal is a titanium halide.

References Cited
UNITED STATES PATENTS

| | | | |
|---|---|---|---|
| 3,583,856 | 6/1971 | Landau et al. | 23—310 |
| 2,881,920 | 4/1959 | Simkin | 23—310 |
| 3,467,639 | 9/1969 | Marconi et al. | 260—94.9 B |

FOREIGN PATENTS

| | | | |
|---|---|---|---|
| 1,131,258 | 10/1968 | Great Britain | 260—94.9 B |

JOSEPH L. SCHOFER, Primary Examiner

A. HOLLER, Assistant Examiner

U.S. Cl. X.R.

23—310; 260—88.2 B, 94.9 B

PO-1050
(5/69)

UNITED STATES PATENT OFFICE
CERTIFICATE OF CORRECTION

Patent No. 3,689,473     Dated September 5, 1972

Inventor(s) Agostino Balducci, et al

It is certified that error appears in the above-identified patent and that said Letters Patent are hereby corrected as shown below:

Column 1, line 6, correct the line to read --Baradel, and

Massimo Marena, Milan, Italy, assignors--.

Column 2, line 61, correct the formula to read:

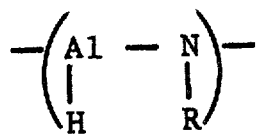

Column 2, line 67, correct the formula to read:

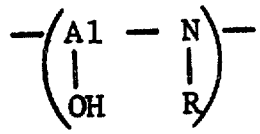

Column 4, line 23, correct the spelling of "operative".

line 70, after "rises" insert --filtering--.

Column 6, in the table, last column, sub-heading under "Al"

should read --p.p.m.--.

Column 7, line 42, after "hydrocarbon" insert --(in the solvent mixture fed to the washing apparatus)--.

Signed and sealed this 19th day of March 1974.

(SEAL)
Attest:

EDWARD M. FLETCHER, JR.
Attesting Officer

C. MARSHALL DANN
Commissioner of Patents